May 7, 1940. T. G. CUNNING 2,199,831
APPARATUS FOR RUBBING OR BRUSHING FRUIT AND THE LIKE
Filed March 23, 1936 3 Sheets-Sheet 1

Inventor
Thomas George Cunning
By Steward & McKay
Attorneys

May 7, 1940. T. G. CUNNING 2,199,831
APPARATUS FOR RUBBING OR BRUSHING FRUIT AND THE LIKE
Filed March 23, 1936  3 Sheets-Sheet 2

May 7, 1940. T. G. CUNNING 2,199,831
APPARATUS FOR RUBBING OR BRUSHING FRUIT AND THE LIKE
Filed March 23, 1936 3 Sheets-Sheet 3

Inventor
Thomas George Cunning
By Steward & McKay
Attorneys

Patented May 7, 1940

2,199,831

UNITED STATES PATENT OFFICE 2,199,831

APPARATUS FOR RUBBING OR BRUSHING FRUIT AND THE LIKE

Thomas George Cunning, Upland, Calif., assignor to Brogdex Company, Pomona, Calif., a corporation of Florida Application March 23, 1936, Serial No. 70,523

23 Claims. (Cl. 146—202)

This invention relates generally to apparatus for rubbing or brushing fruit and the like; and it has to deal particularly with apparatus in which fruit or other articles of generally globular shape may be subjected to frictional action while advancing through a supporting runway formed by members which extend transversely of the path of travel of the fruit through the machine and some of which are rotatable. The apparatus is particularly useful in connection with the commercial preparation for market of fresh fruit and vegetables, such as oranges, lemons, grapefruit, apples, potatoes, tomatoes and the like, all of which may, for convenience, be generically referred to as "fruit."

The preparation of fresh fruit for market usually involves one or more operations in which it is frictionally acted upon, i. e., rubbed or brushed, to an extent which depends upon the nature of the particular operation. Thus, such operations as washing or cleansing fruit to remove undesirable foreign matter, and polishing it to smooth and finish the surface (with or without the application of a protective coating), commonly involve rubbing or brushing, as may also drying the fruit to remove surface moisture after washing. For effecting such operations, one type of machine heretofore used to some extent comprises parallel rotatable cylindrical members, usually brush rolls, which rub, scrub or brush the fruit as it passes over said members transversely of their axes of rotation. Machines of this type have not heretofore been wholly satisfactory, especially as regards control of the rate and character of movement of the fruit over the brush rolls, and general efficiency and effectiveness of their brushing action.

Apparatus or machines heretofore proposed in the attempt to secure some control over the rate of movement of the fruit, some of which machines involved the use of pushers, conveyors, "cleanouts", and the like, have been open to serious objection even when not utterly impractical, because such control as they achieved was only partial, or caused irregular feeding and crowding, bumping or other rough handling of the fruit, and in many cases resulted in machines of low capacity. A further difficulty experienced with prior machines has been that they did not operate to rub the fruit thoroughly enough or with the desired uniformity over its entire surface. In other words, some parts and some fruits were rubbed or brushed to a considerably greater extent than others, due either to the fact that no positive means was provided to give a definite rate of travel to each fruit or because, where such means was provided, it did not satisfactorily cooperate with other parts to accomplish the desired rubbing of the fruit. In other cases, where the results sought were more nearly approximated, the apparatus was often undesirably complicated mechanically.

An object of this invention is to provide apparatus for subjecting fruit to desired frictional action which is free of the above-noted objections and which operates to advance the fruit through the machine automatically, positively and expeditiously and without injury, in such a way that all the surfaces of each individual fruit are frictionally acted upon effectively and also substantially uniformly.

Another object of the invention is to provide apparatus wherein fruit-advancing means cooperate with rotatable brush members in supporting the fruit, and furthering proper frictional action thereupon, said means also serving gently to lift or push the fruit in such manner as to assist it to travel over said brushes on its way through the apparatus.

A further object of the invention is to provide such apparatus in which the rates at which the fruit-advancing means and the rotatable brushes operate, respectively, may be varied independently, whereby the rate of travel of the fruit through the machine and the extent and speed of brushing can be independently and nicely adjusted.

Other objects and novel features and advantages of the invention will become apparent from the following description taken in connection with the accompanying drawings which illustrate practical forms of apparatus embodying the invention, it being understood that the description of these specific embodiments is merely illustrative and not restrictive and that various changes in arrangement and details of construction can be made without departing from the spirit and scope of the invention as set out in the appended claims.

These objects are accomplished, in accordance with the principle of the invention, by apparatus which comprises a plurality of rotatable cylindrical members and a plurality of cooperating transfer members, the two types of members being disposed in alternating parallel relationship so that the upper surfaces of all cooperate to form a runway on which articles may be supported and advanced transversely of said members; together with means for rotating said rotatable members in the same direction to promote advance of articles through said runway transversely of the rotational axes of said members toward a point of discharge; each said transfer member serving to receive articles from one rotatable member and deliver them to the next succeeding rotatable member. Most desirably, each of said transfer members is so mounted as to be capable of limited reciprocatory or oscillatory movement between two of said rotatable members to assist and control the advance of articles through said runway, means being provided for actuating the transfer members independently of said rotatable members.

In order further to explain the underlying principles of the invention, certain specific practical embodiments thereof are shown in the accompanying drawings and described in detail hereinafter by way of illustrative examples only and not as in any way limiting the broad scope of the invention. In these drawings.

Referring first to that embodiment of the invention illustrated in Figs. 1 to 6 of the drawings, the novel fruit-brushing apparatus there shown comprises generally a plurality of rotatable cylindrical brushing members or brush rolls 1 and a plurality of transfer members or impellers 2 oscillatable upwardly and downwardly which cooperate with said brush rolls to form a fruit-supporting path or runway, means 3 for driving or rotating said rotatable members in the same direction, and separate and independent means 4 for driving or actuating said transfer members, all compactly mounted, most desirably, on a suitable framework 5.

Figure 1:
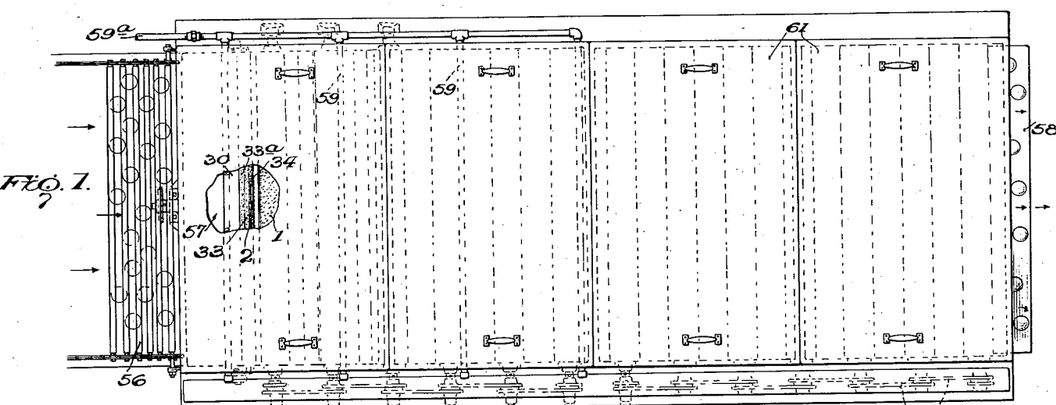
Fig. 1 is a plan view of one form of fruit-brushing apparatus embodying the invention.

Various cooperative arrangements of the series of rotatable brush members or rolls 1 and oscillatable transfer members 2 providing the fruit-supporting path or runway may be made, but in the illustrative example, they are mounted crosswise of the longitudinally extending side bars 6, 7 and 8 of the framework 5 and alternately disposed in parallel relationship so that their upper surfaces form a runway or path along which fruit is advanced transversely of the aforesaid members. Most desirably, said transfer members, as well as the rolls, present brush surfaces 9. The rotatable brush rolls are not in contact with one another, being spaced so far apart that fruit would fall through between them were this not prevented by the transfer members which bridge the gaps or spaces between the rotatable brush rolls and receive the fruit from one brush roll and transfer it to the next succeeding brush roll in the line of travel of the fruit through the machine. As will be seen, a fruit-supporting groove or valley is formed between each brush roll 1 and the next preceding transfer member 2. In the specific form of apparatus here shown, these transfer members or impellers not only cooperate with the rotatable brush members in supporting the fruit in the machine runway and presenting brush surfaces which aid in rubbing the fruit, but because they may be given an oscillatory or reciprocatory movement, they also provide means for positively advancing the fruit through the machine, the fruit being lifted and positively urged forward as the transfer members or impeller brushes move from lowered to raised position.

The means for mounting the rotatable brushes may be of any appropriate character. In the desirable practical form here illustrated, each rotatable brush is secured to a tubular brush shaft 10, one end of which is rotatably supported by a bearing bracket 11 attached to side rail 8 of the framework 5. The other end of said shaft fits over the reduced end 12 of a stub shaft 13 rotatably mounted in a pair of spaced bearings 14 and 15 provided by bearing block or casting 16 removably secured to side rails 6 and 7 of the framework 5. The two shafts are connected together by the removable pin or key 17. Each bearing block or casting may be provided with a plurality of pairs of bearings 14, 15 as shown, adjacent units or castings being removably secured together as well as to the frame. A sprocket wheel or pinion 18 is removably secured to stub shaft 13 by means of a set screw or similar fastening means 19, said sprocket wheel being mounted between the bearings 14 and 15 and the spaced walls 16ª and 16ᵇ of the bearing block or casting 16 whereby said stub shaft is removably secured against longitudinal movement therein. In the arrangement just described it will be seen that the sprocket wheel 18 constitutes a driving member or connection for driving or rotating the removable shaft 10 and the brush 1 secured thereto and that the side walls 16ª, 16ᵇ and the connecting bottom portion 16ᶜ of bearing block or casting 16 constitute a housing for said sprocket wheel, said housing being provided with a removable cover member 16ᵈ.

Means indicated generally at 3 are provided for driving or rotating the brush rolls 1 in the same direction and at various selected speeds. In the example illustrated, each sprocket wheel 18 has two sets of teeth 18ª and 18ᵇ whereby the sprocket wheels of adjacent brushes can be connected together by sprocket chains 18ᶜ, one chain for each pair. Two drive sprocket wheels 181 are also mounted on two of the shafts 13, respectively, preferably adjacent the center of the machine, and are connected together and driven by a somewhat longer sprocket chain 20 which is connected to a sprocket wheel 21 driven by an automatic change-speed mechanism or speed regulator indicated conventionally at 22. The change speed mechanism is driven by an electric motor 23 supported on the under framework of the machine whereby the brush rolls may be driven at various selected speeds by suitably adjusting the speed regulator by means of the usual operating handle. Various speeds may be used as desired, depending somewhat on the size of the rotatable brushes. In a typical instance, the speed may be varied between about 148 and 296 R. P. M., assuming the brushes to be approximately 6 inches in diameter.

Figure 2:
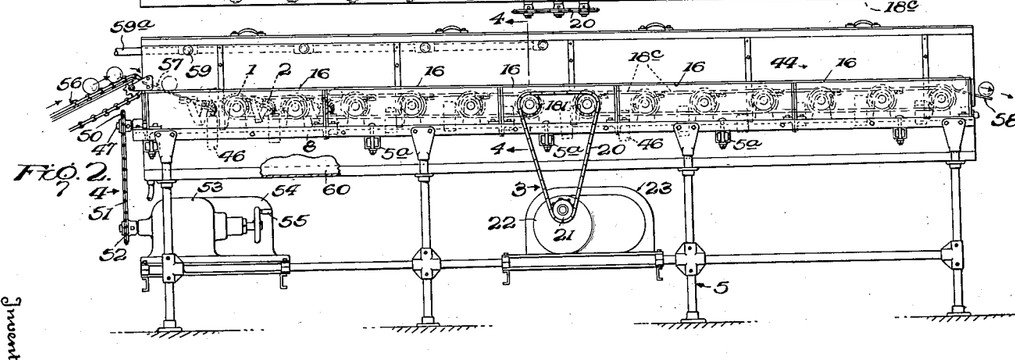
Fig. 2 is a side elevation thereof, only three of the transfer members, oscillatable in this instance and also brush-surfaced, being indicated in dotted lines at the left hand end of the machine, the rest being omitted to avoid complicating the drawings.
Figure 3:
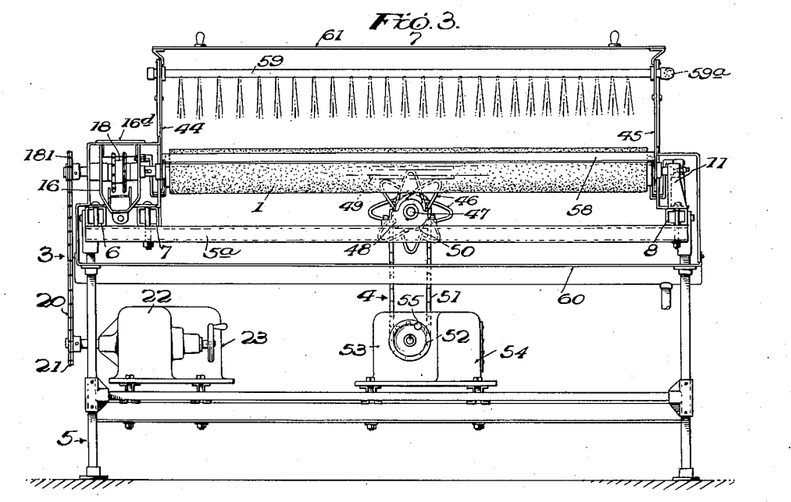
Fig. 3 is an end elevation looking from the right in Fig. 2.
Figure 4:
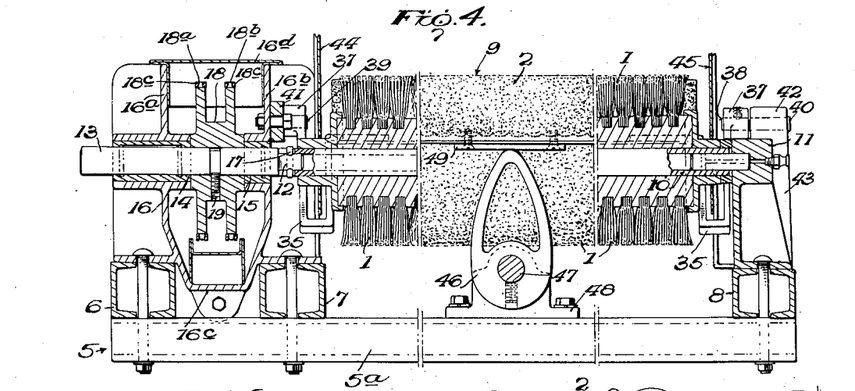
Fig. 4 is an enlarged fragmentary cross-sectional view on the line 4—4 of Fig. 2, a portion of the rotatable brush there shown being broken away to show the next preceding oscillatable brush member in elevated position.
Figure 5:
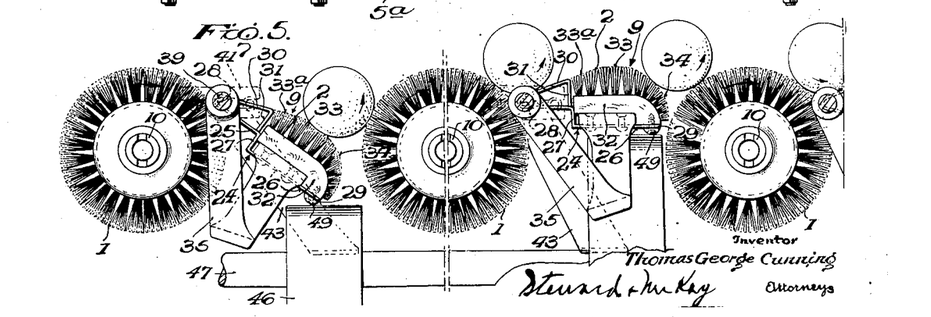
Fig. 5 is an enlarged fragmentary or interrupted longitudinal sectional view showing several of the rotatable and oscillatable brush members, intervening parts being omitted for convenience in order to show two actually non-adjacent oscillatable brush members adjacent and in lowest and highest positions, respectively.

From the description just given, it will be obvious that all the brush rolls are driven in the same direction of rotation and at a speed which can be regulated within certain desired limits, the arrangement being such that the brushes are all driven clockwise or to the right or delivery end of the machine as viewed in Fig. 2.

The specific construction and arrangement of the transfer brush members 2 may differ widely within the scope of the broad invention. In the particularly desirable embodiment here illustrated, each transfer member comprises (Figs. 5, 6) a frame 24 formed from one piece of sheet metal bent to provide two flat base portions 25 and 26 connected by an upright portion 27 at right angles thereto and intermediate the edges 28 and 29. Adjacent the edge 28 is provided an angular or tapered portion 30 which terminates in an upright portion 31, the two upright portions 27, 31 being in substantial alinement and corresponding to form an abutment for a wooden bar or slat 32 which is secured to the base portion 26 of the frame 24. This bar, which is generally rectangular in cross-section, has a curved portion adjacent the edge 29 of the transfer member and is provided with bristles to provide a brush element having a substantially plane brush portion 33, and a curved or arcuate brush portion 34 adjacent edges 29. The bristles are also preferably beveled at 33ª to provide an inclined portion which is in substantial alignment with and forms a continuation of the inclined portion 30 of the frame 24 which tapers to the edge 28 of the transfer member. A relatively flat transfer member is thus provided, whose upper surface slopes downwardly away from the intermediate plane flat portion 33 toward both edges, as viewed in Fig. 6, the portion 30 providing a rather broad perfectly smooth strip which is free of bristles. This is advantageous because it enables the transfer member to operate very efficiently as a brushing member and as a member to control the advance of fruit, as will be pointed out more fully hereinafter.

Many different arrangements for mounting the oscillatable transfer members 2 may be used within the scope of the broad invention. In the present example means are provided for pivotally mounting them so that they can swing without interfering with the stationary side pieces or guards which form the sides of the runway. Each transfer member is pivotally supported at its ends so that its axis of pivoting and its edge adjacent thereto are closely adjacent the periphery of the next preceding brush roll. Thus, in the arrangement here shown, each transfer member is provided adjacent its ends with a substantially U-shaped supporting bracket or holder 35 (see Figs. 4, 5 and 6), the arms of which are arranged at an angle, one terminating in a laterally extending flat projection or plate 36 secured to the frame 24 of the transfer member, and the other in a laterally extending boss 37 provided with a bore 38. These bores are adapted to receive bearings or pivot pins 39 and 40, respectively. Pin 39 is carried by a bracket 41 adjustably secured to wall 16ᵇ of a bearing block or casting 16, while pin 40 is removably secured in bore 38 by a set screw or the like and fits in a bearing 42 carried by a bracket 43 supported on side rail 8 of framework 5. This arrangement makes it possible for the transfer members and their supporting holders or brackets 35 to pivot or swing without interfering with or hitting the longitudinally-extending side guard plates 44 and 45, which extend between the arms of the U-shaped supporting brackets or holders. Moreover, the transfer members can be readily fitted in place or removed by removing pin 40. These guard plates, which also form part of a housing to enclose the brushes, are attached to the framework adjacent the ends of the brush rolls and transfer members, respectively, to keep the fruit from falling off the brushes or going far enough to either side of the machine to be injured by the moving parts. Each transfer member, which in the form and arrangement illustrated may be said to function as a lifter or impeller, is pivotally mounted in such manner and is so proportioned that, not only is its inner edge or edge 28 adjacent the axis of pivoting adjacent the periphery of the next preceding brush roll as already stated, but also the outer or free edge 29 even in its lowermost position, is sufficiently near the periphery of the next succeeding brush roll to prevent articles the machine is designed to handle from dropping through. In its uppermost position, the free edge 29 is still closed to the periphery of the succeeding brush roll. The inner edge is, most desirably, located on a level between the axis and the crest or summit of the next preceding brush roll; the arrangement being such that the transfer member receives on-coming fruit from the next preceding brush roll at a level substantially above the rotational axis thereof and delivers it against the next succeeding brush roll at a substantially lower level. The arc of swing is such that, in the lowermost position of the relatively flat transfer member, articles are supported jointly by it and the next succeeding rotatable brush member at a level somewhat above that of the latter's axis of rotation; while in the uppermost position of said transfer member, articles are similarly supported at a level approximating that of the crest of said succeeding rotatable member. In the uppermost position of the transfer member, the inclined portions 30 and 33ª are inclined to the horizontal and toward the preceding brush to provide a groove or valley between such inclined portions and the periphery of said preceding cylindrical brush roll to assist in controlling movement of the fruit through the machine whereas, when the transfer brush is in its lowermost position, the portions 30 and 33ª thereof are inclined toward the succeeding brush roll. In the raised position, the smooth metal portion 30 temporarily retards or checks the advance of fruit, and in the lowered position it functions as a delivery board to take the fruit coming over the preceding brush roll and deliver it into the valley between the transfer member and the succeeding brush roll, the smooth metal surface 30 preventing fruit from being drawn downward between this portion of the transfer member and the brush roll. In both the uppermost and lowermost positions of the transfer member, the convexly curved or arcuate brush surface 34 adjacent the free edge thereof cooperates with the cylindrical surface of the succeeding brush roll to form a groove or valley in which fruit is received and held for a sufficient length of time to ensure the fruit receiving the desired or required amount of brushing. In the grooves or valleys formed between the brush surfaces of the transfer brush members and the brush surfaces of the rapidly rotating brushes, the fruit receives a thorough brushing of exactly predeterminable and controllable extent. These valleys are deepest, and the brushing action most intense when the transfer members are in lowermost position. Most desirably, the mechanism actuating the transfer members permits them to dwell or remain stationary for a brief period of time in their lowermost position.

The size and speed of the rotating brushes and the arrangement and functioning of the transfer brushes cooperating therewith are so related and coordinated that in normal operation of the machine the fruit is advanced regularly and systematically from one groove or valley to the next groove or valley seriatim toward the delivery end at a rate readily controlled and regulated in such manner as to effect the desired brushing or rubbing of the fruit. The arrangement and mode of operation are such that when any given transfer brush swings upwardly on its pivot, its lifts the fruit and at the same time gives it a certain forward momentum so that finally, when the transfer brush reaches its uppermost position, the groove or valley between its swinging brush-surfaced edge 34 and the adjacent cooperating cylindrical brush member is so shallow that the fruit is carried over the cooperating cylindrical brush member to the next succeeding valley or groove, the curved brush surface 34 of the swinging transfer brush 2 acting somewhat like a cam to aid in lifting and advancing the fruit. In its upward movement, each transfer brush turns or swings anti-clockwise about its axis of pivoting, while the rotary brushes turn clockwise, as here illustrated. From the foregoing it will be obvious that the transfer brush members or impellers function not only as means to positively advance fruit, without injury, through the machine while subjecting it to a maximum amount of brushing, but also to control said advance. In other words, controlling the speed of movement of the transfer brush members controls the speed or rate of advance of the fruit through the machine.

Although providing the transfer members with brush surfaces has distinct practical advantages, it is not to be understood as essential to do so in all cases. On the contrary, it is feasible, and for some purposes desirable, to employ plain or smooth-surfaced transfer members in combination with the rotary brush rolls.

In order that the rate of advance of fruit through the machine may be separately and nicely adjusted and controlled independently of the rotational speed of the brush rolls, the means, indicated generally at 4, for actuating the transfer members is separate from and independent of the means for driving said rolls. While any suitable actuating mechanism may be employed, that here illustrated has certain practical advantages. As best shown in Figs. 3–7, each transfer member is operated or lifted by a cam 46 adjustably secured to a shaft 47, which extends longitudinally of the machine and is rotatably mounted in bearings 48 carried by the transverse bars 5ª of the framework 5. The shape and arrangement of the cams, while obviously susceptible of considerable variation in practice, should be such as to produce movement of the transfer members in proper sequence and timing, as well as properly to determine and control the rate at which each transfer member travels in its own individual up-and-down cycle. In the example here illustrated, the cams are mounted so that each is set at an angle of 45 degrees from the next adjacent cam on either side; that is, with the first cam (at the left or feed end of the machine as viewed in Fig. 2) in any given position, the next cam to the right is advanced 45 degrees relative thereto in the direction of rotation of the cam shaft, and so on through the machine, so that every ninth cam is in the same relative angular position. With a cam of the shape shown in Fig. 4, in which the cam has a low side in the shape of a circular arc having its center in the cam shaft axis, each transfer brush is in its lowest position and stationary for approximately half a revolution of the cam and is partially or fully raised at other times. When the transfer brush is thus stationary, the friction exerted on the fruit by its stationary brushing surface acts as a brake to retard the rotary motion imparted to the fruit by the rotating brush member, and thus the maximum brushing effect is obtained. It will be noted that the remainder of the cam contour is such that the transfer member is next given a relatively quick or rapid upward movement very effective to exert the desired forward impelling action on the fruit to advance it into the next succeeding valley; the transfer member being then permitted to return as quickly to its lowermost position.

Figures 6, 7:
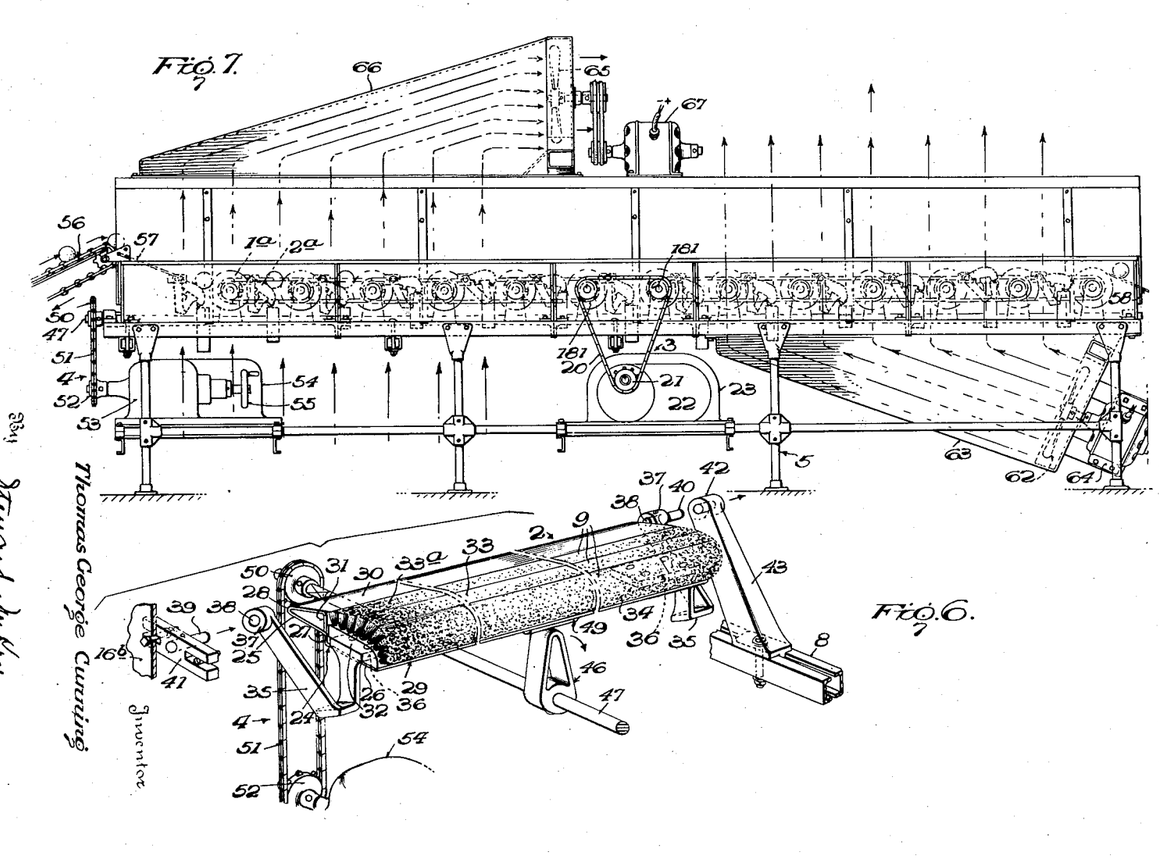
Fig. 6 is an enlarged fragmentary perspective view of one of the oscillatable brush members.
Fig. 7 is a side elevation, similar to Fig. 2, showing the invention embodied in a fruit drier.

The cams are adjustably mounted so that they can be readily changed to any desired relative angular positions. For instance, they can be set so that any two successive oscillating transfer brushes are in lowest and highest positions, respectively. Although various cam settings and shapes can be used, the arrangement in which the cams are set in regular angular sequence, 45° apart, to actuate the transfer members in corresponding sequence, is desirable because it permits a sort of progressive or stepped lifting of the transfer brushes in sequence from the feed end to the delivery end of the machine, with a period when each transfer brush is stationary in its lowest position. The direction of rotation of the cam shaft and the cam setting are preferably such that when one cam is fully raised, the next succeeding cam from feed end to delivery end of the machine is 45° ahead of or past its fully raised position. In other words, the cams from left to right in Fig. 7 are advanced, each being 45° ahead of the preceding cam in the direction of rotation of the cam shaft. It will be observed from the foregoing description that the cams are operable to cause the upward and downward movements of the respective transfer members of the series to occur in such predetermined relation and sequence that the series as a whole describes a substantially undulatory movement effective to control the rate at which fruit advances through the apparatus.

In order to prevent undue wear from the action of the lifting cams, each transfer brush is provided on its under side with a hardened metallic wear strip 49 against which the associated alternating cam bears.

Driving means for cam shaft 47 is here shown as comprising a sprocket wheel 50 fixed thereon and connected by sprocket chain 51 to a sprocket wheel 52, which in turn is driven through an adjustable change-speed mechanism or regulator indicated conventionally at 53 by the electric motor 54. The rotative speed of the cam shaft 47, and hence the frequency at which the transfer brushes 2 are oscillated or reciprocated, can thus be controlled within selected limits, independently of the rotatable brush driving mechanism, by merely adjusting the regulating handle 55 of the speed regulator 53. The rate at which the transfer brushes 2 are oscillated may be varied as desired. In a typical instance these oscillations or complete up-and-down movements are at the rate of about 20-50 per minute.

In operating the apparatus, whether it is to function as a washer, polisher or drier, the fruit (e. g., oranges) or other articles to be subjected to the action of the brushes, are fed to the machine by an elevator, belt conveyor, or other feeding means, indicated somewhat diagrammatically at 56, and delivered to the inclined delivery board or chute 57 located at the left or feed end of the machine as viewed in Fig. 2. The feeding of the fruit is, of course, timed with the operation of the transfer or impeller brushes 2. The fruit advances from the delivery board 57 to the groove or valley formed by the lowered first oscillating transfer brush and the first rotating brush, where it is brushed until the first transfer brush rises to lift the row of fruit supported thereby and advance it over the first rotating brush to the next groove or valley. As the fruit advances toward the second valley, the second transfer brush is in raised position and momentarily checks any tendency of the fruit to advance beyond the second valley, the fruit being temporarily supported between the first brush roll and the inclined smooth anti-friction surface 30 of the second transfer brush. The second transfer brush then quickly descends to deliver the fruit into the second valley between the second transfer brush and the second brush roll. This operation is continued or repeated from valley to valley, the fruit settling down into regular rows in the valleys so that there is an orderly advance from valley to valley in coordination with the rise and fall of the transfer brushes until the fruit has traversed all of the brushes and is delivered to the delivery board 58 at the discharge end of the machine.

Thus it will be seen that the oscillating transfer brushes constitute means for positively advancing fruit at a speed which can be nicely adjusted and controlled and that the fruit is advanced gently and without injury by brush-surfaced mechanism. Both the rate of travel of the fruit and the brushing speed can be independently varied and controlled. Furthermore, as the fruit is supported between the rapidly moving surface of a rotating brush and the stationary or relatively slowly moving surface of an oscillating transfer brush, which tends to act as a brake to retard the rotating motion being imparted to the fruit by the rotating brush, the maximum brushing effect is obtained.

When the apparatus is used as a washer, transverse spray pipes 59, supplied with water or similar liquid containing a mold-retarding agent or not, by a longitudinally extending pipe 59ª, are provided adjacent the feed end of the machine to shower water or other cleaning or treating liquid or solution on the brushes and fruit, a drain pan or drip board 60 being provided to enclose the bottom and drain off excess liquid. The top of the machine may be enclosed by a plurality of cover boards or panels 61.

When the apparatus is used as a polisher, the fruit may be dry brushed, without application of any liquid or solid material, to polish the same. If a coating or protective material is to be applied to the fruit, suitable atomizing, nebulizing or other means for applying a liquid, semi-liquid or solid coating material may be provided.

When the invention is embodied in a drier, as shown in Fig. 7, the general arrangement and construction may be much the same as already described, so far as concerns the combination of rotary members and transfer members cooperating to apply friction to articles and advance them as set forth. But the apparatus includes accessory features especially adapting it to function as a drier. The sides may be enclosed as in the case of the washer (Figs. 1-6); but the top and bottom are left open for free passage of positive air currents supplied, for example, by one or more blowers or blast fans 62, each operating in a hood 63 and driven by an electric motor 64, and by a suction fan 65 operating in hood 66 and driven by electric motor 67, the air currents passing upwardly through the runway-forming members to remove moisture from the fruit and the runway forming members contacted thereby. The rotatable members 1ª, operating in conjunction with the transfer members 2ª, wipe or rub much of the moisture from the wet fruit, spreading the remainder uniformly and very thinly over the surface of the fruit, while at the same time rotating the fruit and exposing it most effectively to the air currents which are thus enabled to exert efficient evaporating action.

While rotatable brushes or frictioning cylinders and brush-surfaced transfer members may be employed in this drier apparatus, it is often more desirable to dispense with brush or bristle surfaces for these members and to use, instead, members having metal surfaces for exerting the desired frictional action on the fruit. This is because metal-surfaced members, employed in the described construction and arrangement, function with peculiar effectiveness to remove or eliminate moisture from the surface of fruit. Thus, for example, in the embodiment illustrated in Fig. 7, the rotatable members or frictioning cylinders 1ª are plain or smooth-surfaced rolls or cylinders, formed of brass or other suitable metal or material, and the transfer members or impellers 2ª are also formed to provide plain or smooth fruit-engaging surfaces of brass or similar metal or material. It is, of course, feasible, and for some purposes desirable, to employ a smooth metal-surfaced rotatable member in combination with a brush-surfaced transfer member, or a metal-surfaced transfer member in combination with a brush-surfaced rotatable member. A particularly desirable combination involving the use of plain or smooth-surfaced members comprises a plurality of rotatable brush members and smooth metal-surfaced transfer members or flappers alternately disposed to form one section of a runway which is left unenclosed, followed by a series of smooth metal-surfaced rotatable members and smooth metal-surfaced transfer members or flappers alternately disposed to form another section of runway, the second section most desirably being enclosed and provided with means for circulating warm air therethrough.

It is to be understood that the term "frictioning cylinders," as used in the specification and claims, includes rotatable members formed as brush-surfaced rolls or cylinders and also rotatable members formed as plain or smooth-surfaced rolls or cylinders, of brass or other suitable metal or material.

Heating means, not shown, may be provided, particularly when the apparatus is used as a polisher and/or drier.

Fruit resting on an appropriate part of the top of a brush I will be advanced by the brush, the extent of such part varying with the speed of the brush, the type of surface, the nature of the fruit, and other factors; and such part of the brush or other rotating instrumentality may be referred to as the propulsion or advancing zone.

What is claimed is:

1. In apparatus for rubbing or brushing fruit or other articles of generally globular shape, a fruit-supporting-and-brushing runway formed by the upper surfaces of a plurality of rotatable brush members each rotatable about a stationary axis and a plurality of oscillatable, non-rotary gravity transfer members mounted crosswise of said runway in alternating arrangement, each transfer member being pivoted adjacent the periphery and above the axis of the preceding rotatable member, means for rotating said rotatable members in the same direction, said rotatable members acting to advance articles through said runway transversely of their axes of rotation toward a point of discharge, and each said transfer member serving as a gravity conveyer to receive articles from one rotatable member and conduct them to the next succeeding rotatable member, and means for imparting a forward and downward inclination to the effective surface of the transfer member after the articles are received thereby.

2. Apparatus for rubbing or brushing globular articles such as fruit, comprising a series of parallel spaced cylindrical brushes each rotatable about a stationary axis in the same direction and with the fruit-engaging portions of their surfaces moving toward a point of discharge, and oscillatable, non-rotary means mounted between each pair of brushes for pivotal movement about an axis located at the side of said means adjacent the periphery and above the axis of the preceding rotatable brush for receiving fruit and assisting movement of the same transversely of said brushes toward said point of discharge.

3. Apparatus for rubbing or brushing globular articles such as fruit, comprising a pair of parallel rotatably mounted cylindrical brush members each rotatable about a stationary axis, means for rotating said brush members in the same direction to assist movement of fruit toward a point of discharge, an oscillatable, non-rotary brush member mounted between said cylindrical brush members for receiving and advancing the fruit from one cylindrical brush member to the next succeeding cylindrical brush member, said oscillatable brush member being pivoted adjacent the periphery and above the axis of the preceding cylindrical brush member, the free edge of said oscillatable brush member being provided with a curved surface which cooperates with the curved surface of the adjacent cylindrical brush member to provide a valley in which fruit may be supported, and means imparting generally vertical oscillation to the oscillatable brush member, the curved surface being arranged to advance the fruit in said valley to the propulsion zone of the succeeding cylindrical member by a non-concentric upward movement.

4. In apparatus for rubbing or brushing fruit or other articles of generally globular shape, an article-supporting and brushing runway formed by the upper surfaces of a plurality of rotatable brush members each rotatable about a fixed axis and a plurality of rockable, non-rotatable transfer members arranged in alternation with the rotatable brush members, means rotating the rotatable brush members in a direction tending to advance the articles toward the discharge end of the apparatus, means supporting the rockable members for rocking movement each about an axis located at the discharge side of the preceding rotatable member and near the crest of said member, and means for rocking the transfer members.

5. In an apparatus for rubbing or brushing fruit or other generally globular articles, in combination, a first brush roll, a second brush roll spaced therefrom, each of said brush rolls being rotatable about a stationary axis, means rotating the brush rolls in a direction to advance the articles, and a rockable, non-rotary bridging transfer device having its rear edge pivoted closely adjacent the upper side of the first brush roll and its forward edge extending into proximity to the second brush roll and swingable in a path substantially tangent to the second brush roll.

6. In an apparatus for rubbing or brushing fruit or other generally globular articles, in combination, a first brush roll, a second brush roll spaced therefrom, each of said brush rolls being rotatable about a stationary axis, means rotating the brush rolls in a direction to advance the articles, and a rockable, non-rotary bridging transfer device having its rear edge pivoted closely adjacent the upper side of the first brush roll and its forward edge extending into proximity to the second brush roll and swingable in a path substantially tangent to the second brush roll, said transfer device having its forward edge rounded to form a convex article-engaging surface so that it constantly presents a downwardly inclined surface for engagement with the article, which surface acts to propel the article in an upward and forward direction as it is swung upward.

7. In an apparatus for rubbing or brushing fruit or other generally globular articles, in combination, a first brush roll, a second brush roll spaced therefrom, means rotating the brush rolls in a direction to advance the articles, and a rockable bridging transfer device having its rear edge pivoted closely adjacent the upper side of the first brush roll and its forward edge extending into proximity to the second brush roll and swingable in a path substantially tangent to the second brush roll, said transfer device being formed with an unyielding article-receiving surface at its rear or receiving end adjacent the first roll and with a brush surface at its forward end adjacent the second roll.

8. In an apparatus for rubbing or brushing fruit or other generally globular articles, in combination, a brushing couple comprising a rotary brush roll rotatable about a stationary axis and a non-rotary, oscillatable brush pivoted above the axis of and opposed to the roll and having an inclined surface cooperative with the roll to form an article-supporting trough, means rotating the rotary brush in a direction tending to lift the article out of the trough, and means for causing the brushing couple to act intermittently by a movement in which the non-rotary brush is swung toward the rotary brush to contract the trough and to discharge the articles acted upon over the top of the rotary brush.

9. In an apparatus for rubbing or brushing fruit or other generally globular articles, in combination, a pair of brush rolls rotatable about stationary axes and spaced apart, means for rotating all the brush rolls in the same article advancing direction, an oscillatory, non-rotary transfer member located in the space between each pair of rolls and having an upper fruit-supporting surface, said transfer member being pivoted adjacent the periphery and above the axis of the preceding brush roll, and means for rocking the transfer member to a position where one end coacts with the succeeding brush roll to form an article-retarding and supporting trough and thereafter to a position where the opposite end of the transfer member coacts with the preceding roll to form a similar trough.

10. In apparatus for rubbing or brushing fruit or other articles of generally globular shape, a fruit-supporting and brushing runway formed by the upper surfaces of a plurality of rotatable brush members and a plurality of non-rotatable reciprocable transfer members mounted crosswise of said runway in alternating arrangement, said transfer members each having an upper surface adapted for brushing, and means for rotating said rotatable members in the same direction and for reciprocating the transfer members transversely of said rotatable members, said rotatable members acting to advance articles through said runway transversely of their axes of rotation toward a point of discharge, and each said transfer member acting to receive articles from one rotatable brush member and assist their movement over the next, the axes of the rotatable brush members being substantially parallel and said transfer members being pivoted to swing about axes parallel thereto, the pivoting axis of each transfer member being located closely adjacent the outer brushing surface of the next preceding rotatable brush member and on the discharge side thereof, at a level higher than the rotational axis thereof, the arc of swing being such that, in the lowermost position of said transfer member, articles are supported jointly by it and the succeeding rotatable brush member at a level somewhat above that of the latter's axis of rotation, while in a higher position of said transfer member, articles are similarly supported at a level approximating that of the crest of the said succeeding member.

11. In a machine for brushing fruit or other globular articles, the combination, with a succession of brush rolls rotatable about stationary axes, of means rotating the rolls in fruit-advancing direction, oscillatable, non-rotary fruit-arresting members associated with the respective brush rolls, each being pivoted adjacent the periphery and above the axis of and cooperative with the delivery side of the associated preceding brush roll to arrest fruit advanced by said roll and maintain it in engagement with said roll, and means for operating said fruit arresting members cyclically to withdraw them from their fruit-arresting positions periodically and in timed relation to one another and to cause the fruit to be systematically advanced from roll to roll.

12. Apparatus for frictional treatment of fruit and similar globular articles, comprising a series of spaced frictioning cylinders each rotatable about a stationary axis, oscillatable, non-rotary fruit-supporting transfer units between the cylinders, each unit being pivoted above the axis and adjacent the periphery of the preceding cylinder and comprising means for simultaneously receiving fruit from the preceding cylinder and propelling other fruit into advancing relationship with the succeeding cylinder, and for shifting fruit from receiving to advancing position, and means for rotating the cylinders in the direction of advance.

13. Apparatus for frictional treatment of fruit and similar globular articles, comprising a series of spaced frictioning cylinders each rotatable about a stationary axis, oscillatable, non-rotary fruit-supporting transfer units between the cylinders, means for imparting a vertical reciprocatory movement to the units, each unit being pivoted above the axis and adjacent the periphery of the preceding cylinder and comprising means for receiving fruit from the preceding cylinder and propelling other fruit into advancing relationship to the succeeding cylinder during the upper part of the cycle of said movement, and for transferring the received fruit from receiving to propelling position during the remainder of the cycle, and means for rotating the cylinders in the direction of advance of the fruit.

14. Apparatus for frictional treatment of fruit and similar globular articles, comprising a series of spaced frictioning cylinders, fruit-supporting transfer units between the cylinders, each unit comprising a smooth receiving face located in upper position in juxtaposition to the preceding cylinder above its axis to form therewith a fruit-receiving trough, and a brush-surfaced discharge face forming a continuation of the receiving face and extending into operative relationship with the propulsion zone of the succeeding cylinder, means for imparting a vertical reciprocatory movement to the unit, transferring fruit from the receiving face to the discharge face during the lower portion of such movement, and across the succeeding cylinder to the receiving face of the succeeding unit during the upper part of such movement, and means for driving the cylinders in the direction of fruit advance.

15. Apparatus for frictional treatment of fruit and similar globular articles, comprising a series of spaced frictioning cylinders each rotatable about a stationary axis, oscillatable, non-rotary fruit-supporting transfer units between the cylinders, each unit being pivoted above the axis and adjacent the periphery of the preceding cylinder and comprising a face forming in lower position an open-bottomed fruit-retaining trough with the face of the succeeding cylinder, means for imparting to each unit a vertical reciprocatory movement to discharge fruit over the succeeding cylinder and receive fruit from the preceding cylinder in upper position, means for rotating the cylinders in the direction of fruit advance, and means for passing a current of air through said open troughs and around the fruit therein.

16. Apparatus for rubbing or brushing fruit or other generally globular articles comprising, in combination, a brushing couple including a brush roll rotatable about a stationary axis and a non-rotary, oscillatable brush pivoted above the axis of and having an inclined brushing surface cooperative with the roll to form an article-supporting trough, means rotating the rotary brush in a direction to lift the article out of the trough, and means for periodically shifting the brushing surface to discharge articles in the trough over the top of the rotary brush.

17. Apparatus for treating fruit and other articles of generally globular shape comprising, in combination, a series of frictioning cylinders, each rotatable about a stationary axis, alternating with non-rotary, oscillatable transfer units arranged to form an article-frictioning runway, each unit being pivoted adjacent the periphery and above the axis of the preceding cylinder and having an article-supporting surface including an article-receiving face associated with the preceding cylinder and a connected article-advancing face associated with the succeeding cylinder, means for rotating said cylinders in the direction of advance of the articles, and means for cyclically actuating the units by raising and lowering each unit, operative to elevate the article-advancing face relative to the article-receiving face during upward movement.

18. Apparatus for rubbing or brushing globular articles such as fruit, comprising a plurality of oscillatable and cylindrical brush members alternately disposed in parallel relationship to form a fruit-supporting runway, said oscillatable brush members being pivotally mounted, one between each pair of cylindrical brush members, with the inner edge adjacent the periphery of one cylindrical brush member and the outer edge adjacent the periphery of the succeeding cylindrical brush member, for advancing fruit transversely of said brush members; each oscillatable brush member being provided with a plane portion at the inner edge and a curved portion at the outer edge, means for operating said oscillatable brush members so that in lower position the plane portion is inclined downwardly toward the delivery end and the said plane portion in upper position is inclined downwardly toward the feed end of the apparatus, and means for rotating the cylindrical brush members in the same direction with the fruit-engaging portions of their surfaces moving toward a point of discharge.

19. Apparatus for brushing fruit comprising a plurality of rotatable brush members, each rotatable about a stationary axis, and a plurality of oscillatable, non-rotary transfer members alternately disposed in parallel relationship to provide a plurality of valleys for receiving fruit which is advanced transversely of said members, each of said transfer members being pivoted adjacent the periphery and above the axis of the preceding rotatable brush member, means for operating the oscillatable transfer members including a driven shaft extending longitudinally beneath the members, a plurality of cams, one engaging the lower part of each oscillatable transfer member intermediate its ends, and means for securing the cams to the shaft in any desired phase relationship; and means for rotating the rotatable brush members in the direction of advance of the articles.

20. In an apparatus for treating articles of a general globular shape, such as certain fruit, the combination, with a series of rotatable article-rubbing rolls spaced apart so that a single article cannot make contact simultaneously with any two rolls, each roll being rotatable about a stationary axis, and means for simultaneously rotating all the rolls to move their upper surfaces in one article-advancing direction, of a series of reciprocatory transfer members, one for each space between two rolls, each transfer member having one end pivoted on an axis adjacent the discharge side of the periphery of its next preceding roll, said axis being substantially parallel to and above the rotational axis of said preceding roll, each transfer member having an upper surface comprising two portions sloping downward away from each other from an intermediate line toward the pivoted and free ends respectively of the transfer member, and means for repeatedly reciprocating each transfer member from an upper position, where the free end will discharge articles over the next succeeding roll, to a lower position where it will retain articles in contact with said succeeding roll.

21. In an apparatus for treating articles of a generally globular shape, such as certain fruit, the combination, with a series of rotatable article-rubbing rolls spaced apart so that a single article cannot make contact simultaneously with any two rolls, each roll being rotatable about a stationary axis, and means for simultaneously rotating all the rolls to move their upper surfaces in one article-advancing direction, of a series of reciprocatory transfer members, one for each space between two rolls, each transfer member having one end pivoted on an axis adjacent the discharge side of the periphery of its next preceding roll, said axis being substantially parallel to and above the rotational axis of said preceding roll, each transfer member having an upper surface comprising two portions sloping downward away from each other from an intermediate line toward the pivoted and free end respectively of the transfer member, and means for repeatedly reciprocating the series of transfer members seriatim, moving each transfer member from an upper position, where the free end will discharge articles over the next succeeding roll, to a lower position where it will retain articles in contact with said succeeding roll.

22. Apparatus for rubbing or brushing globular articles such as fruit, comprising a series of parallel spaced frictioning cylinders each rotatable about a stationary axis in the same direction and with the fruit-engaging portions of their surfaces moving toward a point of discharge, and oscillatable, non-rotary means mounted between each pair of cylinders for pivotal movement about an axis located at the side of said means adjacent the periphery and above the axis of the preceding rotatable cylinder for receiving fruit and assisting movement of the same transversely of said cylinders toward said point of discharge.

23. In apparatus for frictional treatment of fruit or other articles of generally globular shape, an article supporting and frictioning runway formed by the upper surfaces of a plurality of rotatable frictioning cylinders each rotatable about a fixed axis, and a plurality of rockable, non-rotatable transfer members arranged in alternation with the rotatable cylinders, means rotating the rotatable cylinders in a direction tending to advance the articles toward the discharge end of the apparatus, means supporting the rockable members for rocking movement each about an axis located at the discharge side of the preceding cylinder and near the crest of said cylinder, and means for rocking the transfer members.

THOMAS GEORGE CUNNING.